United States Patent [19]

Landa

[11] Patent Number: 5,036,365

[45] Date of Patent: Jul. 30, 1991

[54] FIELD ASSISTED FILTER AND ELECTROPHOTOGRAPHIC COPYING MACHINE USING THE SAME

[76] Inventor: Benzion Landa, 10010-119 St., Edmonton, Alberta, Canada

[21] Appl. No.: 273,831

[22] Filed: Nov. 21, 1988

[51] Int. Cl.[5] ...................... G03G 15/10; B01D 17/06

[52] U.S. Cl. .................................... 355/256; 204/302

[58] Field of Search ................ 355/256, 298; 204/302, 204/299 R; 118/659, 660

[56] References Cited

U.S. PATENT DOCUMENTS

| | | | |
|---|---|---|---|
| 3,129,115 | 4/1964 | Clark et al. | 355/256 X |
| 3,287,244 | 11/1966 | Mel | 204/180 |
| 3,606,531 | 9/1971 | Gourdine | 355/256 X |
| 3,655,550 | 4/1972 | Davies | 204/302 |
| 3,663,100 | 5/1972 | Itoh et al. | 355/256 X |
| 3,749,059 | 7/1973 | Sato | 355/256 X |
| 3,758,204 | 9/1973 | Mochizuki | 355/256 X |
| 3,839,176 | 10/1974 | McCoy et al. | 204/302 X |
| 3,861,861 | 1/1975 | Thettu | 432/59 |
| 3,900,003 | 8/1975 | Sato et al. | 355/256 X |
| 3,909,383 | 9/1975 | Sato | 204/302 X |
| 3,936,376 | 2/1976 | Centineo | 204/302 X |
| 3,972,800 | 8/1976 | King | 204/302 |
| 4,066,526 | 1/1978 | Yeh | 204/302 X |
| 4,110,029 | 8/1978 | Goshima et al. | 355/256 |
| 4,168,329 | 9/1979 | Miyakawa et al. | 355/266 X |
| 4,286,039 | 8/1981 | Landa et al. | 430/119 |
| 4,306,970 | 12/1981 | Tanaka et al. | 210/222 |
| 4,329,565 | 5/1982 | Namiki | 355/290 X |
| 4,411,976 | 10/1983 | Landa et al. | 430/114 |
| 4,501,482 | 2/1985 | Stryjewski | 355/290 |
| 4,687,319 | 8/1987 | Mishra | 355/256 |
| 4,727,394 | 2/1988 | Bov, Jr. et al. | 355/290 |
| 4,731,636 | 3/1988 | Howe et al. | 355/256 X |
| 4,737,268 | 4/1988 | Giddings | 209/12 |
| 4,763,158 | 8/1988 | Schlueter | 355/284 |
| 4,766,462 | 8/1988 | Dyer et al. | 355/256 |
| 4,785,327 | 11/1988 | Landa et al. | 355/256 |
| 4,799,452 | 1/1989 | Day | 204/302 X |

FOREIGN PATENT DOCUMENTS

| | | |
|---|---|---|
| 57-207557 | 12/1982 | Japan . |
| 60-94112 | 5/1985 | Japan . |
| 865829 | 9/1981 | U.S.S.R. . |
| 891122 | 12/1981 | U.S.S.R. . |

*Primary Examiner*—Fred L. Braun

*Attorney, Agent, or Firm*—Sandler, Greenblum & Bernstein

[57] ABSTRACT

A filter for separating a flowing fluid containing charged particles into two streams, one essentially free of particles and one laden with particles, includes a main conduit having an inlet at one end for receiving the flowing fluid, and having two outlets downstream of the one end for dividing the flow into two outlet flow paths. A pair of electrodes between which the fluid flows, is located in the main conduit upstream of the outlets; and each of the outlets is associated with a respective electrode. Voltage sources are connected to the electrodes such that one is more positive than the other for establishing, in the fluid flowing between the electrodes, an electric field transverse to the direction of flow whereby the particles in the field are attracted toward one of the electrodes and travel into the outlet associated therewith. A dielectric coating of release material in the form of a fluorosilicone polymer is applied to the surface of the one electrode for inhibiting plating-out of particles thereon while fluid flows in the conduit.

21 Claims, 2 Drawing Sheets

FIELD ASSISTED FILTER AND ELECTROPHOTOGRAPHIC COPYING MACHINE USING THE SAME

TECHNICAL FIELD

This invention relates to a field assisted filter and electrophotographic copying machine using the same.

RELATED APPLICATION

The subject matter in this application is related to the subject matter in copending application Ser. No. 375,348 filed July 3, 1989, which is a continuing application of Ser. No. 273,830 filed Nov. 21, 1988, now abandoned.

BACKGROUND OF THE INVENTION

U.S. Pat. No. 4,737,268 discloses a particle classification system in which a liquid stream containing different types of particles is introduced into an enclosed channel subjected to a field gradient that is transverse to the direction of flow. The different types of particles respond differently to the field and are segregated into different flow substreams within the channel according to the effect of the field on the particles. These substreams are intercepted at spatially displaced positions in order to recover the different particles.

This principle of particle separation would be useful in connection with liquid toner based electrophotographic copying machines for filtering charged toner particles from the toner liquid for these machines. In these types of copying machines, an electrostatic latent image is formed on a photoconductive carrier movable into proximity with a developer electrode held at a voltage intermediate the voltages on the carrier representative of background and information portions of the image. Liquid toner, comprising dielectric carrier liquid containing charged toner particles, is applied between the carrier and the developer electrode. As regions of the carrier associated with background portions of the image move past the developer electrode, the local electric field is directed toward the electrode and charged toner particles in the vicinity are drawn toward the developer electrode. As regions of the carrier associated with information portions of the image move past the electrode, toner particles in the vicinity are drawn to and are plated-out on such regions thereby developing the latent image on the carrier into a visible image.

After the image is developed, the carrier moves to a transfer station where the developed image is transferred to a receiving sheet. Thereafter, the carrier is cleared of any residual toner particles, charged to a high voltage at a charging station, and then moved to an image transfer station where another image is optically projected onto the carrier. The process described above then repeats.

It is often useful in liquid toner based electrophotographic copying machines to process the liquid toner to recover liquid carrier substantially free of toner particles. To this end, a separation system similar to that disclosed in the '268 patent referred above can be utilized. In such case, toner laden liquid toner would pass through a conduit that divides the flow into two separate flow paths just downstream of a pair of electrodes that establish a unidirectional field transverse to the direction of flow. If the toner is negatively charged, the electric field urges the particles towards the positive electrode increasing the concentration of particles in the fluid adjacent that electrode. Thus, a flow pattern is created which carries most of the particles that entered the conduit into the flow path adjacent the positive electrode. The remainder of the liquid flowing through the other of the flow paths will be substantially free of toner particles.

The basic problem with this arrangement is the plating-out of toner particles on the positive electrode which has a two-fold effect: a local neutralization of the electric field due to the presence of the negatively charged particles on the positive electrode, and a physical reduction in the flow path. Thus, a periodic deplating operation has to be carried out. While techniques for periodically deplating the positive electrode are available (e.g., see U.S. Pat. No. 4,168,329, the disclosure of which is hereby incorporated by reference), the necessity for this procedure adds to the complexity and cost of the equipment.

It is therefore an object of the present invention to provide a new and improved field assisted filter, and an electrophotographic copying machine using the same, which eliminates or substantially reduces the need for deplating the electrode of the filter.

BRIEF DESCRIPTION OF THE INVENTION

A filter according to the present invention for separating a flowing fluid containing charged particles into two streams, one essentially free of particles and one laden with particles, includes a main conduit having an inlet at one end for receiving said flowing fluid and having two outlets downstream of said one end for dividing the flow into two outlet flow paths. A pair of electrodes is located upstream of the outlets; and each electrode is associated with a different one of the respective outlets. Voltage sources are connected to the electrodes such that one is more positive than the other for establishing, in the fluid flowing in the conduit, an electric field transverse to the direction of flow whereby particles in the field are attracted toward one of said electrodes and travel into the outlet associated therewith. According to the present invention, inhibition means are associated with said one electrode for inhibiting plating out of the charged particles on the electrode as fluid flows through the electrode.

The inhibition means may include a dielectric coating of release material on the surface of the electrode facing the fluid. When the toner particles are negatively charged, the dielectric material may be a fluorosilicone polymer, preferably, Dow Corning 730 Solvent Resistant Sealant. The preferred thickness is about 20 microns.

When the toner particles are positively charged, the release coating may include an additive that renders the coating slightly conductive. When the polymer coating is Dow Corning 730 Solvent Resistant Sealant, the additive is preferably Catafor CA100. The additive should be less than 1% by weight and preferably should be in the range of about 0.5% to about 0.7% by weight.

BRIEF DESCRIPTION OF DRAWINGS

Non-limiting embodiments of the present invention are shown in the accompanying drawing wherein.

DETAILED DESCRIPTION

Figure 1:
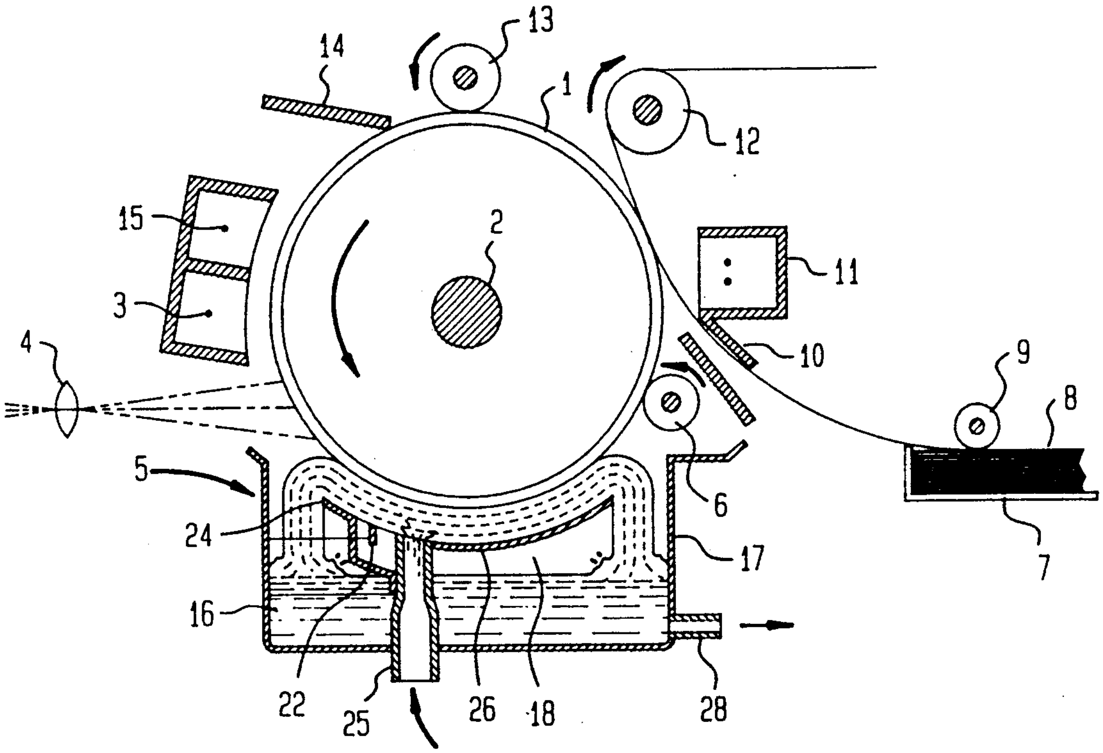
FIG. 1 (PRIOR ART)
FIG. 1 is schematic representation of a liquid toner based electrophotographic copying machine such as disclosed in the '329 patent referred to above.

Referring now to FIG. 1, reference numeral 1 designates a drum having a photosensitive coating on its surface and mounted for rotation on shaft 2 in a direction indicated by the arrow. During rotation, the drum surface is uniformly charged by corona discharger 3. An image of an object being copied is projected through lens 4 onto the surface of the drum forming thereon an electrostatic latent image of the object. At developing station 5, the latent image is developed into a visual image using a developing solution applied to the surface of drum. Residual solution on the drum is removed by roller 6 and the developed image on the drum is transferred to sheet 8 supplied from a stack contained in receptacle 7 by feed roller 9 which passes the sheet through guide 10 into superposed relationship with the developed image on the drum. Transfer corona discharger 11 applies a discharge to the back surface of the transfer sheet to transfer the developed image on the drum onto the transfer sheet. Exit roller 12 delivers the transfer sheet to the user.

Drum 1 continues to rotate and passes under cleaner roller 13 and scraper 14 both of which remove any residual toner from the drum. The surface of the drum is then subjected to a discharge from discharger 15 thereby eliminating any remaining electric potential on the drum and completing a copy cycle.

At developing station 5, tank 17 holds a quantity of developing solution 16 which is supplied via conduit 25 to curved plate 18 which acts as a developer electrode held at a voltage intermediate the voltages on the drum representative of background and information portions of the image. Details of the operation of the developing station are contained in the '239 patent referred to above.

Figure 2:
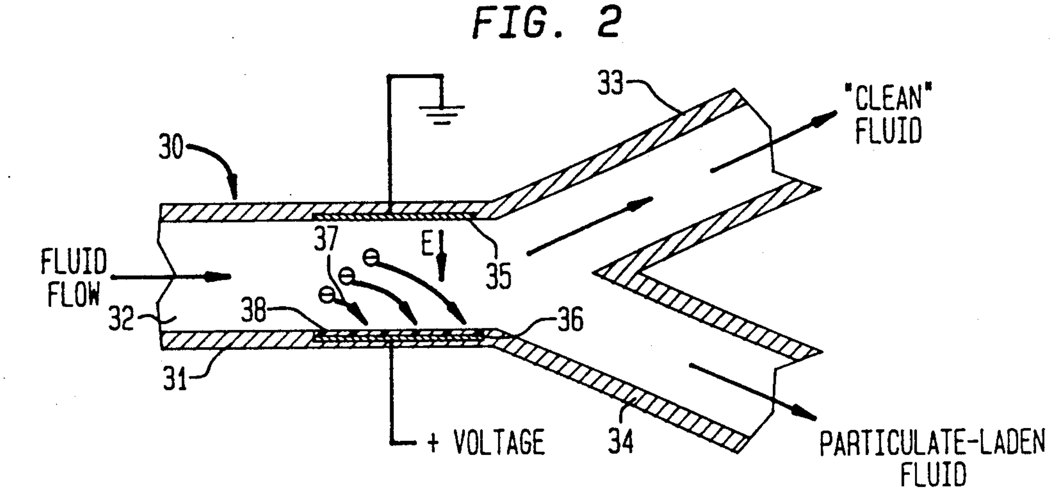
FIG. 2 is a side sectional view of a filter according to the present invention.

Liquid toner contained in tank 17 is drawn from conduit 28 before being returned to the developing station. Filtering can be carried out for the purpose of obtaining relatively clean toner liquid, i.e., liquid that is substantially free of toner particles. Filter 30 shown in FIG. 2 is a filter suitable for separating toner particles from the toner liquid. As shown in FIG. 2, filter 30 comprises main conduit 31 having inlet 32 at one end for receiving fluid flowing in the direction indicated by the arrow, and containing negatively charged toner particles. Conduit 31 has two outlets 33 and 34 downstream of inlet 32 for dividing the flow into two outlet flow paths as indicated. Contained within conduit 31 is a pair of electrodes between which the fluid flows, the electrodes being located upstream of outlets 33 and 34. Each of the outlets is associated with a respective electrode. That is to say, outlet flow path 33 is associated with electrode 35, and outlet flow path 34 is associated with electrode 36.

In the embodiment shown in FIG. 2, the toner particles are negatively charged and electrode 35 is grounded while a positive voltage is applied to electrode 36. Thus, the fluid flowing between the electrodes is subjected to a static electric field transverse to the direction of flow and the negatively charged toner particles are urged downwardly toward electrode 36. The horizontal drag forces on the particles due to the flowing fluid coupled with the downward electrostatic force exerted by the electric field imparts a downward trajectory to the particles as they move through the electrodes as indicated by the flow lines 37. Because the particles are attracted towards the lower electrode, the fluid flowing through outlet flow path 34 associated with electrode 36 will be heavily laden with toner particles. On the other hand, fluid flowing through outlet flow path 33 will be depleted of toner particles and will be essentially "clean".

In order to inhibit the plating-out of particles on electrode 36 while the fluid is flowing between the electrodes, inhibition coating 38 is applied to the surface of the electrode facing the fluid. The coating may be a fluorosilicone polymer, preferably Dow Corning 730 Solvent Resistant Sealant. A coating whose thickness is about 20 microns is suitable. Finally, the surface of each electrode in contact with the carrier liquid is flush with the interior wall surface of the conduit in which the electrode is mounted to minimize turbulence.

Figure 4:
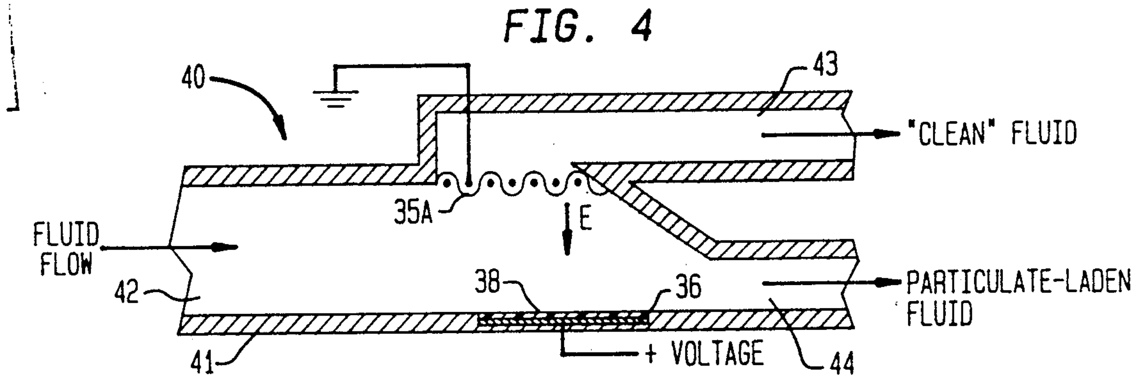
FIG. 4 is a side sectional view of a second embodiment of the invention.

An alternative embodiment of the invention is designated by reference numeral 40 in FIG. 4. In embodiment 40, the negative electrode is in the form of metallic screen 35A which is grounded. Fluid flowing into inlet 42 of filter conduit 41 40 is affected by electrodes 36 and in the same manner that fluid flowing in filter 30 is affected. That is to say, particle-laden fluid passes though outlet flow path 44 associated with positive electrode 36 and particle depleted fluid passes through outlet flow path 43. Inhibition coating 38 on electrode 36 inhibits plating-out of toner particles during the separation operation.

Figure 5:
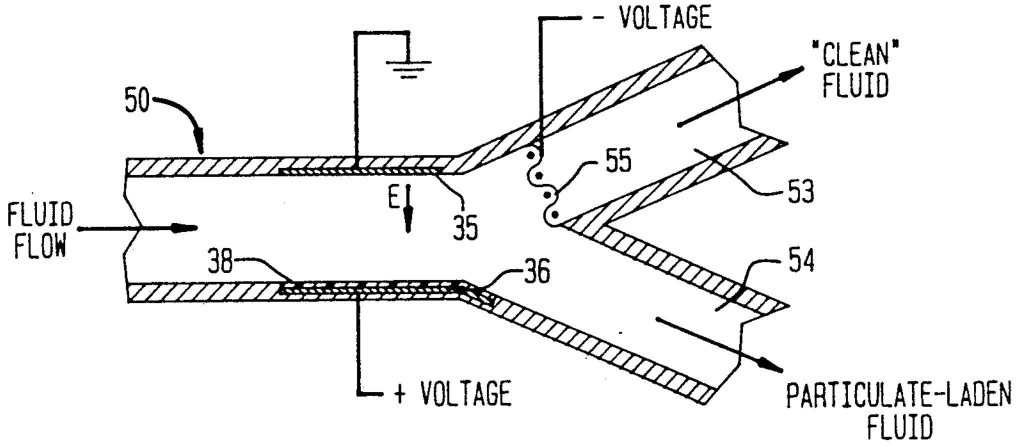
FIG. 5 is a further embodiment of the present invention.
Figure 3:
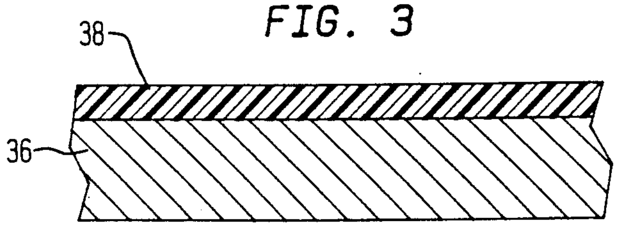
FIG. 3 is a sectional view of one electrode of the filter shown in FIG. 2 for the purpose of showing inhibition means associated with the electrodes.

In alternate embodiment 50 shown in FIG. 5, the electrode configuration is like that shown in FIG. 2 in that electrode 35 is grounded, and electrode 36 is positively changed. As a consequence, the particle-laden fluid flows in the lower portion of conduit 51, and particle-depleted fluid flows in the upper portion of the conduit. However, in this embodiment, negatively charged screen 55 is placed over outer flow path 53 though which the particle-depleted fluid flows for repelling any negatively charges toner particles contained in the fluid about to enter outlet flow path 53. The repelled particles are carried into outlet flow path 54 by the fluid flowing thereinto.

When the charge on the toner particles is positive, it has been found helpful to make the dielectric coating slightly conductive by an additive which causes the resistivity of the coating to be in the range of about $10^{12}$ to about $10^{11}$ ohm-cm. A suitable additive to the preferred fluorosilicone polymer for this purpose is Catafor CA100, a product currently produced by AMB Chemicals Ltd., Poleacre Lane, Woodley Stockport, Cheshire, England. To obtain this degree of conductivity, less than about 1% by weight of the preferred additive is used. The preferred range of additive to dielectric is about 0.5% to about 0.7% by weight. Percentages greater than about 1% by weight do not inhibit sticking of toner particles to the electrode.

As a further modification, the present invention also contemplates eliminating the coating on the surface of the electrode, and instead periodically reversing the bias on the electrodes. In this way, any plating of the electrodes occurring during the separation process will be accounted for by a deplating operation that occurs during the reverse biasing operation.

While the present invention is described and shown in connection with a filter system for separating charged toner particles from a dielectric carrier liquid associated with a liquid toner photocopier machine, the invention is applicable to other separation operations. In addition, the voltages applied to the various electrodes and screens may be such that unidirectional electric fields are produced. Actually, the voltages may vary with time, but the field should remain unidirectional except in the case of voltage reversal to effect deplating when uncoated electrodes are involved.

The advantages and improved results furnished by the method and apparatus of the present invention are apparent from the foregoing description of the preferred embodiment of the invention. Various changes and modifications may be made without departing from the spirit and scope of the invention as described in the appended claims.

I claim:

1. A filter for separating a flowing fluid containing charged particles into two streams, one essentially free of particles and one laden with particles, said filter comprising:

a) a main conduit having an inlet at one end for receiving said flowing fluid and having two outlets downstream of said one end for dividing the flow into two outlet flow paths;

b) a pair of electrodes between which the fluid is adapted to flow and located upstream of the outlets, each outlet being associated with a respective electrode;

c) voltage sources connected to the electrodes such that one is more positive than the other for establishing, in the fluid flowing between the electrodes, a unidirectional electric field having a having a component transverse to the direction of flow whereby particles in the field are attracted toward one of said electrodes and travel into the outlet associated therewith; and d) inhibition means associated with said one electrode for inhibiting plating-out of particles on said one electrode while fluid flows in the conduit.

2. A filter according to claim 1 wherein said inhibition means include a dielectric coating of release material on the surface of the electrode facing the fluid.

3. A filter according to claim 2 wherein said coating is a fluorosilicone polymer.

4. A filter according to claim 3 wherein said polymer is Dow Corning 730 Solvent Resistant Sealant.

5. A filter according claim 2 wherein said coating includes an additive that renders the coating slightly conductive.

6. A filter according to claim 5 wherein said coating includes a fluorosilicone polymer.

7. A filter according to claim 6 wherein said additive less than at 1% by weight.

8. A filter according to claim 7 wherein said additive is in the range of 0.5% to about 0.75% by weight.

9. A filter according to claim 5 wherein the coating has a resistivity in the range $10^{12}$ to $10^{11}$ ohm-cm.

10. A filter according to claim 1 wherein said fluid is a dielectric liquid.

11. A filter according to claim 10 wherein the outlets are vertically oriented, the lower of the outlets being associated with said one electrode.

12. A filter according to claim 11 wherein the voltage source connected to said one electrode is positive.

13. A filter according to claim 12 wherein the voltage source connected to the other of said electrodes is ground.

14. A filter according to claim 12 including a screen that is held at a lower voltage than said one electrode.

15. A filter according to claim 14 wherein said screen constitutes the other of said electrodes.

16. A filter according to claim 15 wherein said screen is grounded.

17. A filter according to claim 14 wherein said screen is separate from said other electrode, and is held at a voltage lower than the voltage on said other electrodes.

18. A filter according to claim 1 wherein said liquid comprises carrier liquid, and said charged particles comprise charged toner particles dispersed therein.

19. A liquid toner based electrophotographic copying machine comprising:

a) movable photoconductive carrier;

b) means for producing an electrostatic latent image on the carrier;

c) a developing station containing a source of toner liquid that includes charged toner particles, said station being operatively associated with the carrier for contacting the same with said liquid thereby developing the latent image by effecting the transfer of toner particles to said image;

d) an image transfer station operatively associated with the carrier downstream of the developing station for transferring the developed image on the carrier to a support sheet; and e) a filter for separating toner particles from the toner liquid, said filter comprising:

(1) a main conduit having an inlet at one end for receiving said toner liquid and having two outlets downstream of said one end for dividing the flow into two outlet flow paths;

(2) a pair of electrodes located upstream of the outlets, each outlet being associated with a respective electrode; and (3) voltage sources connected to the electrodes such that one is more positive than the other for establishing, in the liquid flowing in the conduit, an electric field having a component transverse to the direction of flow whereby toner particles in the field are attracted toward one of said electrodes and travel into the outlet associated therewith; and (4) inhibition means associated with said one electrode for inhibiting plating out of toner particles on said one electrode while fluid is flowing in the conduit.

20. A machine according to claim 19 wherein said inhibition means includes a dielectric coat of release material on the surface of the electrode facing the fluid.

21. A machine according to claim 20 wherein said dielectric coating is a fluorosilicone polymer.

* * * * *